United States Patent [19]
Swift et al.

[11] Patent Number: 5,825,665
[45] Date of Patent: Oct. 20, 1998

[54] BICYCLE INCLINOMETER

[76] Inventors: Daniel P. Swift, 1918 Curtis, Laramie, Wyo. 82070; Thomas R. LaCroix, 244 E. Faller Rd., Grand Jct, Colo. 81503; William E. Bullock, P.O. Box 1328, Glenwood Springs, Colo. 81602; Dennis L. Frobish, 202 Lannom Cir., Tullahoma, Tenn. 37388

[21] Appl. No.: 889,696

[22] Filed: Jul. 8, 1997

[51] Int. Cl.⁶ ............................................. G01C 9/06
[52] U.S. Cl. ........................ 364/559; 33/366; 33/355 R; 324/252; 324/207.21; 250/231.13; 250/231.18
[58] Field of Search ............................. 364/559; 33/366, 33/1 PT, 355 R, 364; 324/207.21, 252; 250/231.33, 231.38, 231.14

[56] References Cited

U.S. PATENT DOCUMENTS

| | | | |
|---|---|---|---|
| 4,129,852 | 12/1978 | Knecht | 340/443 |
| 4,352,063 | 9/1982 | Jones | 324/171 |
| 4,554,535 | 11/1985 | Floris | 340/689 |
| 4,561,188 | 12/1985 | Williams | 33/366 |
| 4,760,372 | 7/1988 | Watson | 340/432 |
| 5,027,522 | 7/1991 | Cagan | 33/366 |
| 5,031,329 | 7/1991 | Smallidge | 33/366 |
| 5,311,666 | 5/1994 | Jacobsen et al. | 33/1 PT |
| 5,432,503 | 7/1995 | Pekar | 340/680 |
| 5,450,676 | 9/1995 | Thornsberry | 33/366 |
| 5,469,630 | 11/1995 | Lewis | 33/355 R |
| 5,650,613 | 7/1997 | Lewis | 250/231.18 |
| 5,670,780 | 9/1997 | Lewis | 250/231.14 |

*Primary Examiner*—James P. Trammell
*Assistant Examiner*—Hien Vo

[57] ABSTRACT

A slope measuring device, suitable for use on bicycles or other vehicles. Slope measurements are made by sensing the position of a weighted disk rotating in a cylindrical chamber. The disk is hermetically sealed and it's position is electrically monitored. Damping methods prevent the disk from moving radically over rough terrain and an onboard microprocessor processes disk readings to make accurate slope calculations. The device clamps to the handle bars of a bicycle and may be battery or generator powered.

17 Claims, 6 Drawing Sheets

BICYCLE INCLINOMETER

BACKGROUND OF THE INVENTION

(a) Field of the Invention

This invention relates to an incline or slope measuring device, more particularly as a bicycle accessory and more specifically to a device that mounts on the handle bar or other location visible to the rider and which measures the positive or negative slope the bicycle is negotiating. The device is battery or generator powered and contains a microprocessor to monitor and average position readings from the sensing elements in the device.

(b) Description of the Prior Art

Many methods of slope measurement are known in the industry and have been used in numerous applications varying from controlling earth moving equipment to stabilizing naval guns. All are suitable for their intended purpose, but have some limitations for use in the current application. The more traditional method of establishing a fixed plumb axis is by use of a gyroscope as in U.S. Pat. No. 4,561,188 by Williams for slope detection. The obvious disadvantages of such a device are that relatively large amounts of power are required to drive the gyroscope, the gyroscope requires a large volume and is relatively heavy, and the position sensors are somewhat complicated making this method impractical for the intended application. Other methods of measuring slope are understood and demonstrated by U.S. Pat. No. 5,450,676 by Thornsberry which uses a disk which is allowed to rotate within a tubular chamber and whose position is monitored by use of photocells. One obvious disadvantage of this method is excess power consumption for light generation to drive the photocells. Other methods of slope measurement such as U.S. Pat. No. 5,432,503 by Pekar rely on structures that engage the ground and so are obviously not suitable for use on moving vehicles such as a bicycle. Still other methods of measuring slope rely on conductive fluids whose position is sensed by such methods as proximity induction (U.S. Pat. No. 4,554,535 by Floris) or resistance change (U.S. Pat. No. 4,129,852 by Knecht). The disadvantage of this method is that on rough moving vehicles such as a bicycle, the conducting fluids are unstable or constantly in motion so that a consistent or average slope cannot be determined.

SUMMARY OF THE INVENTION

Accordingly, the object of this invention is to address and to correct as many of the disadvantages of the currently produced detectors as possible.

It is desirable to provide a slope measuring device to a bicycle so that the rider can monitor the positive or negative slopes he is negotiating. This would be valuable for training purposes, competitions, or to just evaluate the overall difficulty of a ride. This present invention teaches improvements in slope or incline measuring devices that is lightweight, compact, battery or generator powered with minimal power consumption, with a slope measuring means suitable for use on a bicycle or other vehicles as desired. The device is provided with a clamping method to fasten the device to the handle bars of a bicycle where it can be viewed by the rider. Other mounting means would be available to mount the device in different vehicle types. The slope measuring device is composed of a cylindrical chamber containing a rotating disk, that is weighted so that the disk is gravitationally held plumb. A method of sensing the relative displacement of the disk relative to the cylindrical chamber is contained in the chamber and the displacement values are electronically transmitted to a microprocessor where they are evaluated and then delivered to a suitable display device such as a Light Emitting Diode, Liquid Crystal, or other display devices as may become available.

It is an object of the present invention to provide a slope detection device for use on a vehicle so that the sensor disk is completely sealed within a housing chamber to protect the mechanism from damage, dust, dirt, and moisture.

It is another object of the present invention to provide a slope detection device for use on a vehicle so that movement of the sensor disk is dampened to eliminate minor abrupt motions due to minor bumps in the terrain and associated vehicular responses.

It is still another object of the present invention to provide a slope detection device for use on a vehicle where the movement of the sensor disk is detected by a magnetic field contained in the disk passing in close proximity to a conducting element which is part of a series of conducting elements located around the curved surface of the cylindrical chamber containing the disk.

It is still another object of the present invention to provide a slope detection device for use on a vehicle where the movement of the sensor disk is detected by a magnetic field contained on the disk, passing in close proximity to a conducting element which is part of a series of conducting elements arranged around the curved surface of the cylindrical chamber housing the disk, and when the magnetic field is between two conducting elements, the position of the disc is determined by interpolating between the current strengths in the conducting elements.

It is still another object of the present invention to provide a slope detection device for use on a vehicle where the movement of the sensor disk is detected by a rotating element in contact with the disk which drives an electric sensor.

It is yet another object of the present invention to provide a slope detection device for use on a vehicle where the position of the sensor disk is monitored at predetermined time intervals and averaged after a period of time before displaying the slope value.

It is still another object of the present invention to provide a slope detection device for use on a vehicle that is durable, light, small, and economical to produce.

These and other objects of the present invention will become apparent to those skilled in the art from the following detailed description, showing the contemplated novel construction, combination, and elements as herein described, and more particularly defined by the amended claims, it being understood that changes in the precise embodiments to the herein disclosed invention are meant to be included as coming within the scope of the claims, except insofar as they may be precluded by the prior art.

DESCRIPTION OF THE PREFERRED EMBODIMENTS

Figure 1:
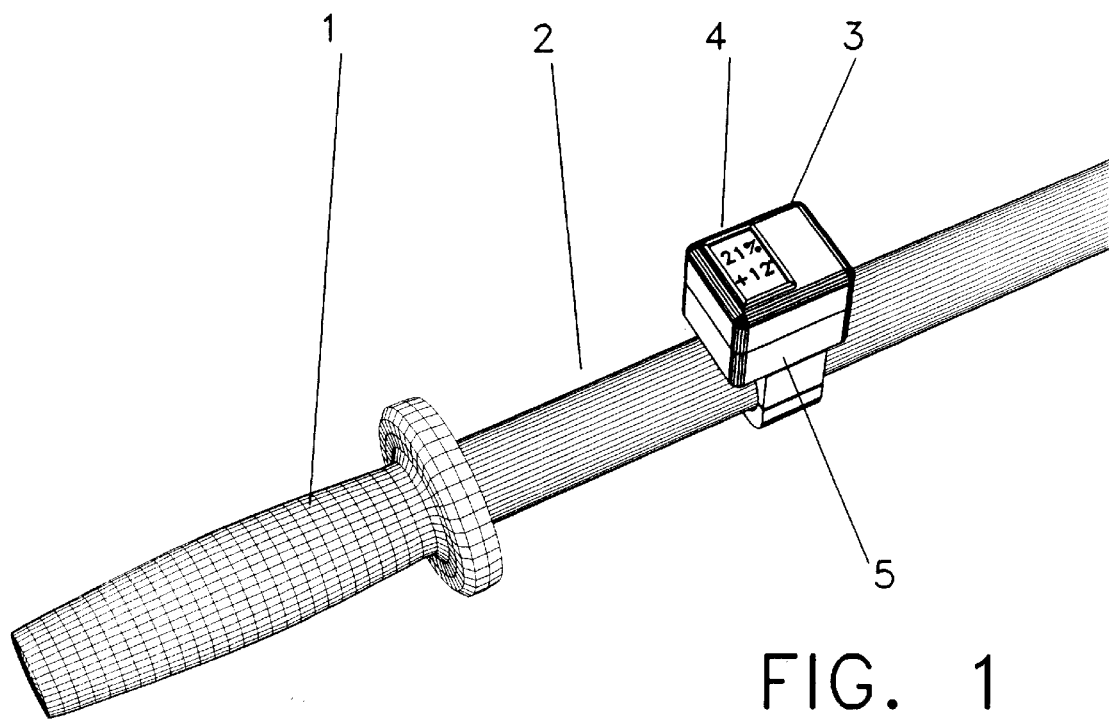
FIG. 1 is a perspective view of a bicycle handle bar with the slope detector clamped in position.
Figure 2:
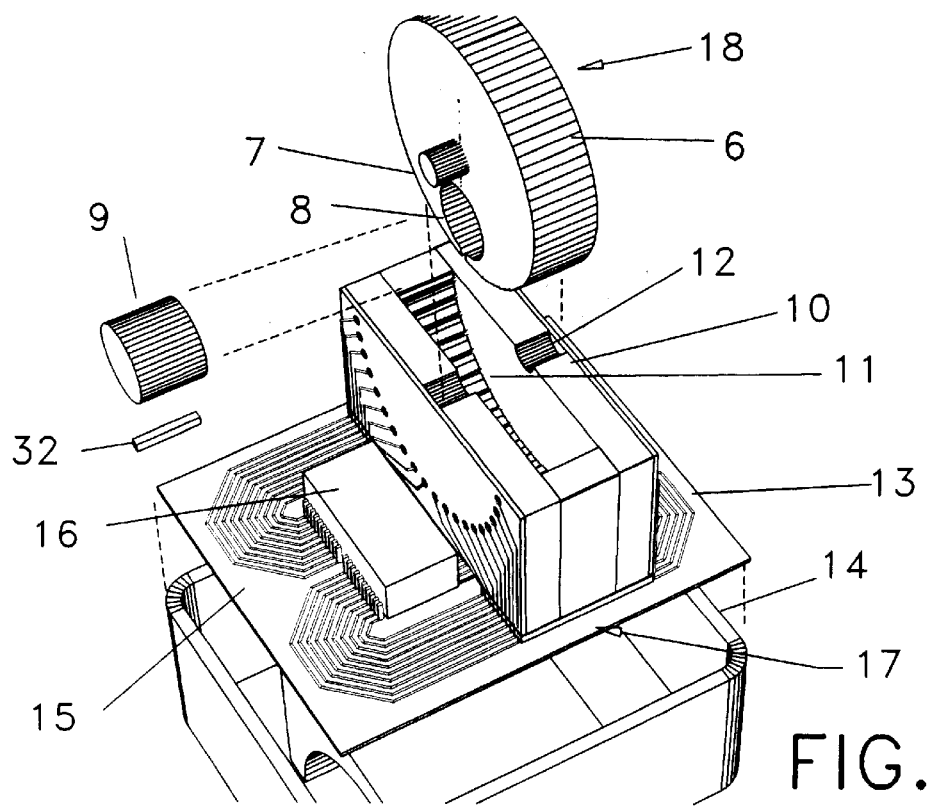
FIG. 2 is a detailed exploded perspective view of the slope detector with current induction sensing from a generally downward angle.
Figure 3:
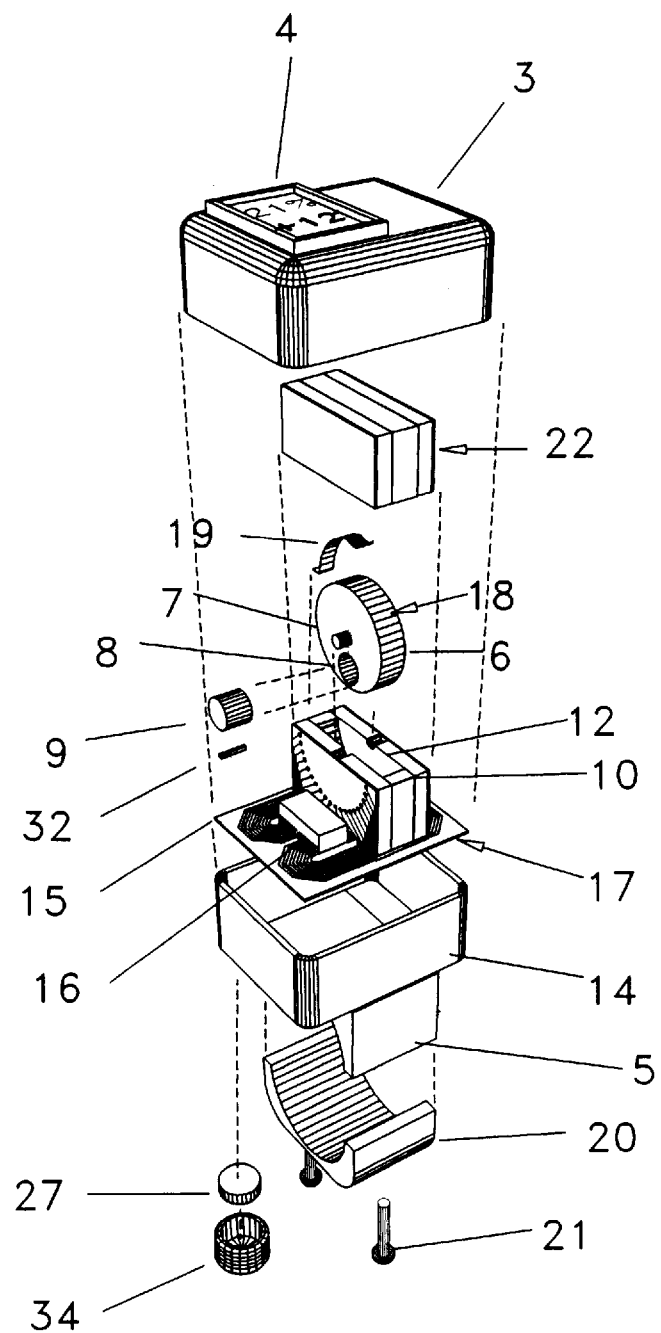
FIG. 3 is an overall exploded perspective view of the slope detector with current induction sensing from a generally downward angle.
Figure 7:
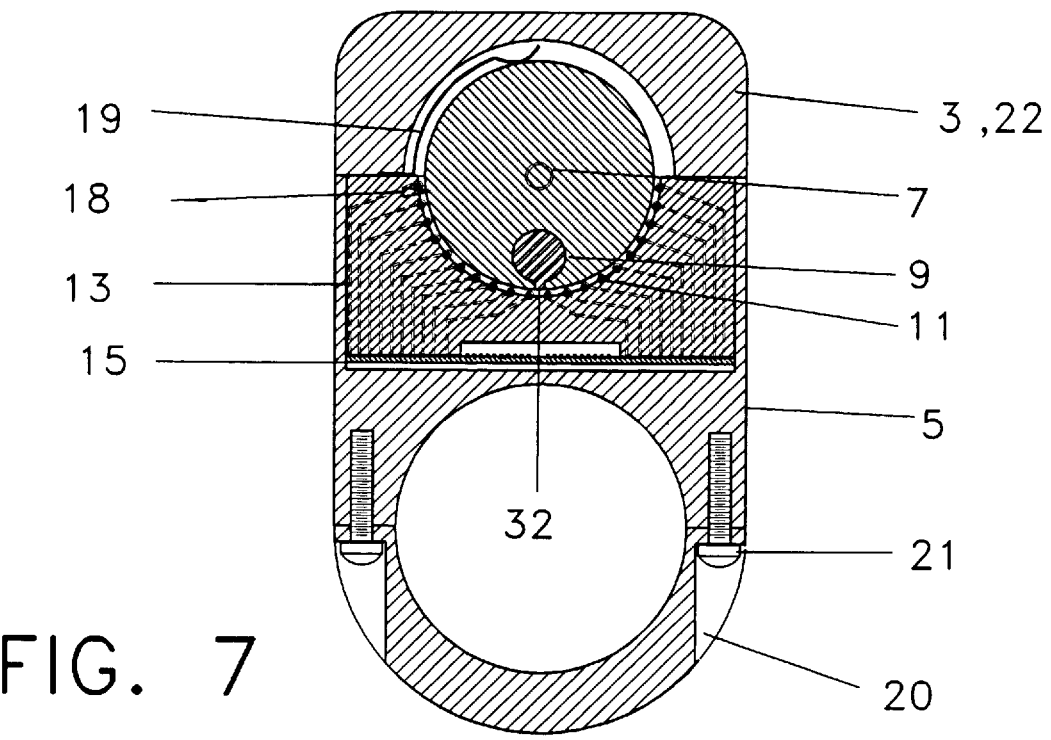
FIG. 7 is a cross sectional section view through the slope detector at the sensor disk with current induction sensing.

The preferred embodiment of the slope detector can best be appreciated by referring to FIG. 1. A slope detecting mechanism is housed under upper case 3 which also holds a Light Emitting Diode, Liquid Crystal, or other display device 4 that displays the current slope in percent, degrees, feet per feet, or any combination of the three. A clamp body 5 holds the detector in a fixed position on the handle bar 2 with hand grip 1. The sensing mechanism can best be described by referring to FIG. 2. A sensor disk assembly 18 is comprised of a disk body 6, axles 7, and a weight hole 8 into which weight 9 with permanent magnet stem 32 is friction fitted or cast. A lower chamber body 10 contains a cylindrical chamber 33 and axle cradle 12. Conductive wires or wire coils 11 extend across the curved face of cylindrical chamber 33 at intervals and extend through the side walls of lower chamber body 10 where each is connected by a wire or printed circuit conductor 13 forming a distinctive circuit. Printed circuits and other components such as lower chamber body 10 and microprocessor 16 are mounted on printed circuit card 15 forming card assembly 17. Assembly 17 fits into the bottom of lower case 14. Additional components of the detector can be best described by referring to FIG. 3. Sensor disk assembly 18 is fitted into cylindrical chamber 33 and on axle cradles 12. Damper spring 19 mounts on the top edge of lower chamber body 10 and frictionally engages the outside curved surface of sensor disk assembly 18, thereby preventing rapid, extreme, and unrepresentative swings of the sensor disk assembly 18. The disk and spring are hermetically sealed with upper chamber body 22. Card assembly 17 is fitted into lower case 14 and hermetically sealed with upper case 3 with display 4. Clamp body 5 receives lower clamp 20 which is held in place by screws 21. A battery 27 fits into a chamber in lower case 14 to power the detector. The sensing method is best described by referring to FIG. 7. As the bicycle or other vehicle encounter a positive or negative slope the body of the detector rotates with the vehicle, leaving the sensor disk assembly 18 free to rotate to plumb by gravitational attraction. As the disk rotates, the permanent magnet stem 32 passes conductive wires or coils 11 thereby introducing an electrical current in the conductor as it passes. The strength of the current in any of the circuits indicates the amount of rotation of the sensor disk assembly 18 and therefore slope. Slope values, each of which is associated with a distinct circuit, are stored in the Read Only Memory of the microprocessor 16 to be retrieved and processed as directed by the processor program. For example, when permanent magnet stem 32 rotates to between any wires 11, current may be generated in more than one wire so more precise slope determinations are made by the microprocessor 16 by interpolating between circuit current strengths and directions or both.

Minor bumps and dips in the road causing vibrations or minor rocking of the bicycle will cause minor oscillations in the sensor disk. Most of these effects are eliminated by mechanical damping, but an electronic damping effect is also performed by the microprocessor 16. Slope values retrieved from the Read Only Memory as appropriate for the circuit current readings generated from wires 11 as the sensor disk swings, are stored over a predetermined period of time and then averaged before sending the reading to display device 4. As the rate of change of oscillations of readings increases, indicating a rougher road, the time interval for polling and averaging readings may increase.

Figure 4:
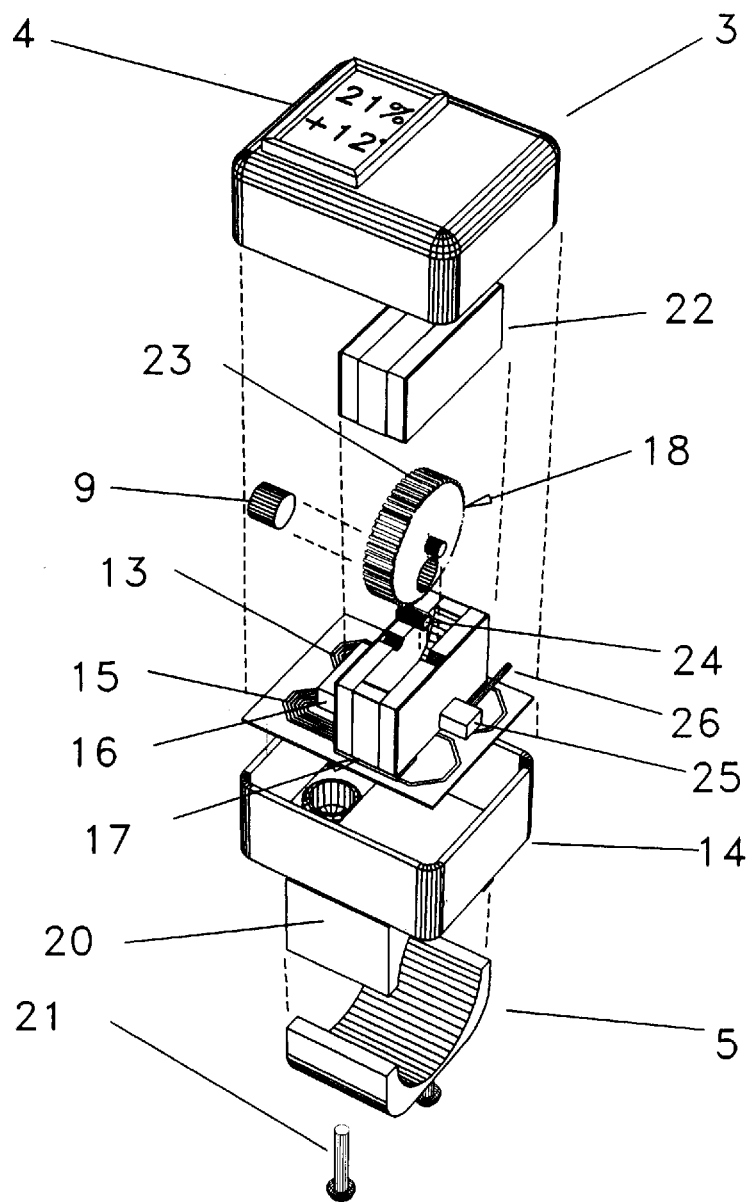
FIG. 4 is an overall exploded view of the slope detector with rotary sensing from a generally downward angle.
Figure 5:
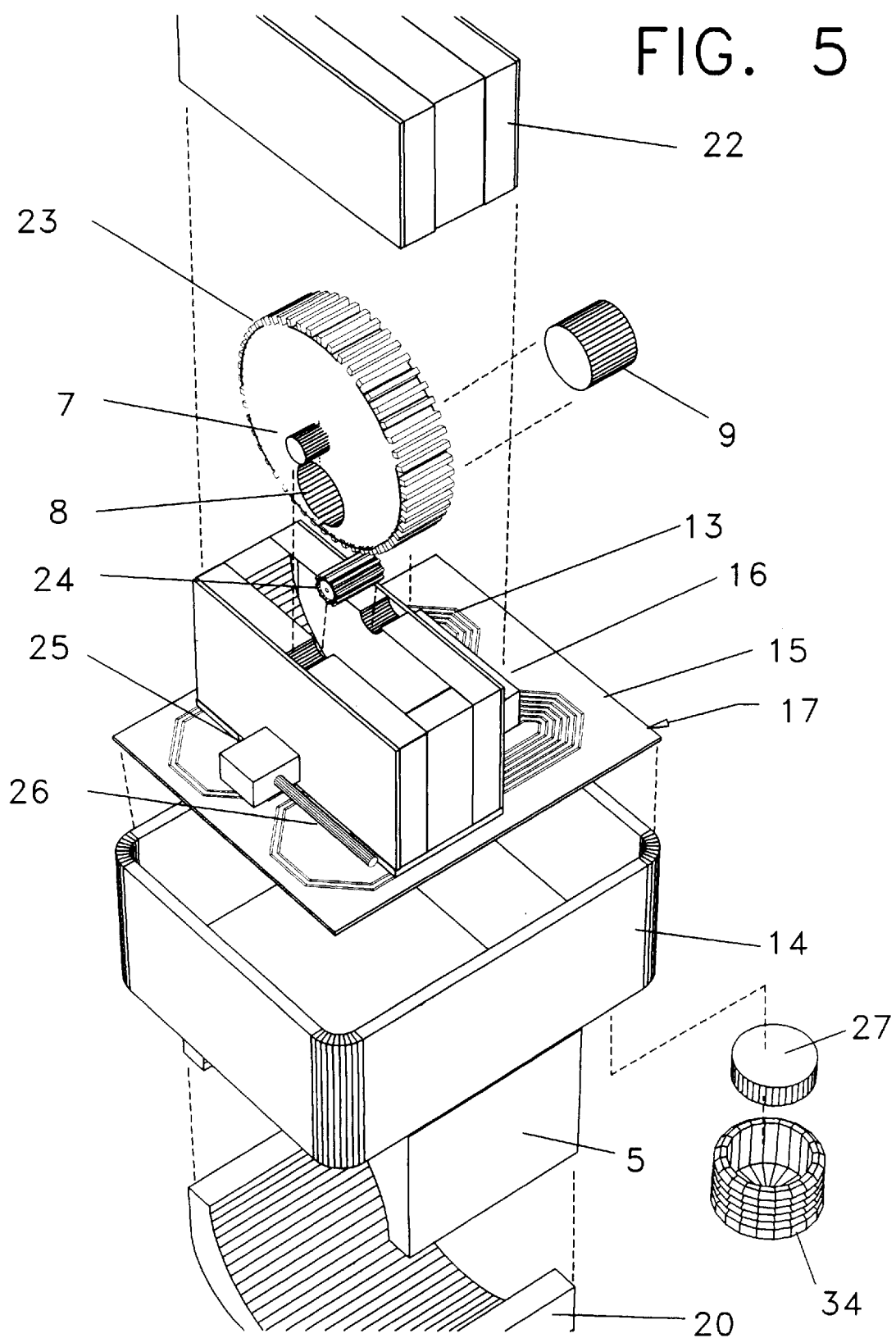
FIG. 5 is a detailed exploded view of the slope detector with rotary sensing from a generally downward angle.
Figure 6:
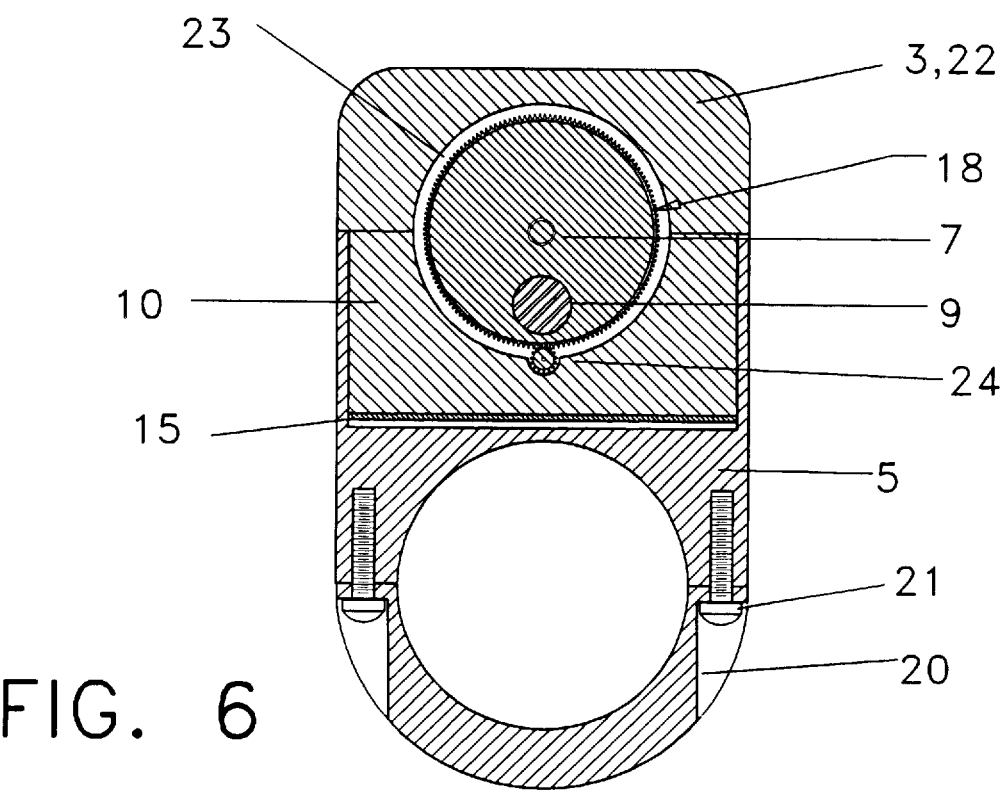
FIG. 6 is a cross section view through slope detector at the sensor disk with rotary sensing.

An alternate method of monitoring the sensor disk assembly 18 position is illustrated in FIG. 4, FIG. 5, and FIG. 6. Sensor disk assembly 18 is provided with a gnurled, toothed, or other high friction surface 23 which engages a similar and compatible surface on wheel 24. Wheel 24 drives an electrical sensing mechanism 27 which by revolution of wheel 24 determines the position of sensor disk 18. The operation of wheel 24 and sensor 25 is understood in the industry and is similar to the sensing devices in a computer mouse. When the slope detector is mounted on a bicycle and is not at true level, the initial reading may set to zero with adjusting stem 26. Wheel 24 may also serve as a damping method, by increasing friction between its axle and the lower chamber body, modifying the wheel 24 diameter or other understood methods. Readings from the sensing unit 25 are sampled by the microprocessor 16 at predetermined intervals. Position values and associated slope values are stored in the Read Only Memory of the microprocessor 16. The current slope value is determined by interpolating between stored position values and detected wheel position. As before, on rough roads where the sensor disk may be oscillating, slope values read from the Read Only Memory are stored and averaged before sending the reading to the display device 4. As before, as the rate of change of oscillations of readings increases, indicating a rougher road, the time interval for polling and averaging readings may increase.

Figure 8:
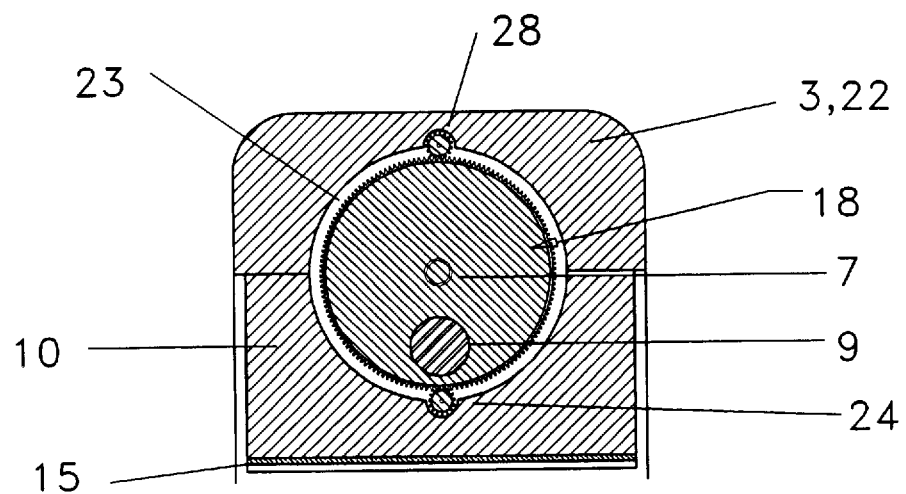
FIG. 8 is a cross section view of the slope detector at the sensor disk with added rotary damping.

FIG. 8 illustrates an additional damping wheel 28 engaged with sensor disk 18.

Figure 9:
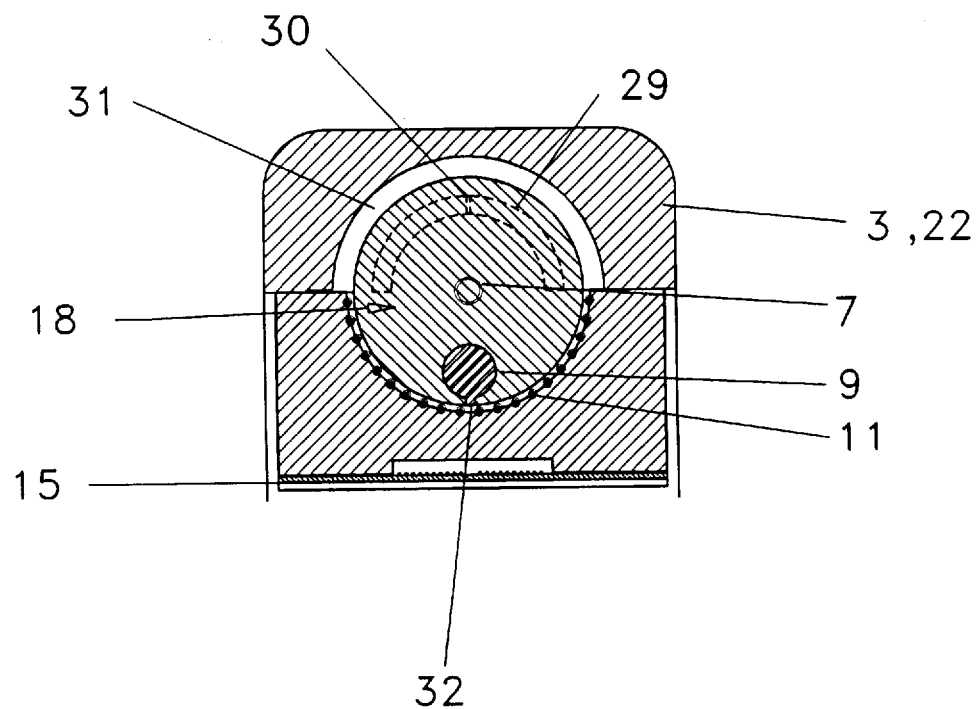
FIG. 9 is a cross section view of the slope detector at the sensor disk with channel and blade for fluid damping.

FIG. 9 illustrates a means for fluid damping. A semicircular channel 29 is cast in the side wall of cylindrical chamber 33. A semicircular tab 30, of size and proportion to engage channel 29 is integral with sensor disk 18. A damping fluid 31 fills the cylindrical chamber 33 and so fills channel 29. Damping is provided by fluid pressure applied against the tab 30 as the disk rotates. Fluid forced from channel 29 at the interface between chamber bodies 22, 10 and disk 18 allows the disk to slowly rotate. An orifice may be provided in tab 30, allowing adjustment of damping force.

In both embodiments, rotation of the sensor disk is determined by electrical means and the readings are analyzed by a microprocessor to eliminate irrelevant deviations from the general slope value.

It is seen that the present invention addresses and corrects many of the disadvantages of the currently produced slope measuring devices, particularly for bicycles. It provides a device that is light weight, with low power requirements, small size, simple mechanism, and sealed against dirt and moisture, making it suitable for use on bicycles or other vehicles.

Although the description above contains many specificities, these should not be construed as limiting the scope of the invention but merely as providing illustrations of some of the presently preferred embodiments of this invention. For example, where one damping wheel is shown there may be multiple wheels. The orientation of the assemblies may vary so that the zero slope position of the sensor disk may be any number of degrees from that shown in the drawings. The clamping assembly may be replaced with an adhesive mounting method for surface mounts. Though circuit wires are shown around the curved surface of the cylindrical chamber, they may be arranged on the side walls of the chamber and the magnet may be inserted into the side of the sensor disk.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

Thus the scope of the invention should be determined by the appended claims and their legal equivalents, rather than by the examples given.

What is claimed is:

1. A device assembly for detecting slopes and displaying slope values, said assembly comprising;
   a. a cylindrical chamber of sufficient size to contain a disk and with recesses in the side walls of size and shape to receive an axle about which said disk may rotate inside said cylindrical chamber;
   b. a weight embedded or mounted at the outside edge of said disk causing said disk to maintain position as said cylindrical chamber rotates in a direction perpendicular to said axle;
   c. a series of electrical conductors or coils mounted at one or more intervals around all or a portion of the curved surface of said cylindrical chamber;
   d. a magnet embedded or mounted at the outside edge of said disk, said magnet being in position to induce a current into said conductors or coils as said magnet passes by said conductors or coils;
   e. a microprocessor mounted in a case, housing said cylindrical chamber and said disk;
   f. a circuit means to carry inducted current from each said electrical conductor or coil to said microprocessor;
   g. a detecting means to determine which of said circuits is conducting electricity;
   h. said microprocessor has stored slope values associated with each said circuit and programming means to retrieve said stored values based on which said circuit is conducting electricity;
   i. said microprocessor has programming means to send slope values to display means.

2. The device of claim 1 where said disk motion is limited by damping means.

3. The device of claim 2 where said damping means is a spring in frictional contact with said disk.

4. The device of claim 2 where said damping means is a fluid in said cylindrical chamber.

5. The device of claim 4 where said cylindrical chamber side walls contain a semicircular groove and said disk contains a compatible tab of size and shape to move in said groove as said disk rotates in said cylindrical chamber.

6. The device of claim 1 with a clamping means to install said device on the handlebars of a bicycle or motorcycle.

7. The device of claim 1 with a leveling mounting means to install said device on a surface.

8. The device of claim 1 where said disk is hermetically sealed in said cylindrical chamber and said device is hermetically sealed in a case.

9. The device of claim 1 where the programming means is a process of operating a data processor of known type to enable said data processor to:
   a. check all circuits to said cylindrical chamber for current flow;
   b. sort current values for highest value and store said highest value;
   c. recall a slope value from said data processor's Read Only Memory associated with said highest current value;
   d. either, after a number of iterations, sort said current values for next highest value in a circuit adjacent to the circuit with said highest value, retrieve associated slope value for said next highest value, and with an equation of known type, solve for true slope by interpolating between slope values using current values, and send said true slope value to said display device or;
   e. sum associated slope value for said highest current value to a running total and, after a number of iterations, send an average slope value to said display device.

10. A device assembly for detecting slopes and displaying slope values, said assembly comprising;
    a. a cylindrical chamber of sufficient size to contain a disk and with recesses in the side walls of size and shape to receive an axle about which said disk may rotate inside said cylindrical chamber;
    b. a weight embedded or mounted at the outside edge of said disk causing said disk to maintain position as said cylindrical chamber rotates in a direction perpendicular to said axle;
    c. a wheel in said cylindrical chamber in a position to engage said disk with sufficient traction means to turn as said disk rotates;
    d. a sensing means driven by said wheel to establish position of said disk;
    e. a microprocessor mounted in a case, housing said cylindrical chamber and said disk;
    f. a circuit means to carry an electrical signal denoting disk position from said sensing means to said microprocessor;
    g. said microprocessor has stored slope values associated with stored position values and programming means to retrieve said stored values based on transmitted said electric signal denoting disk position;
    h. said microprocessor has programming means to send slope values to display means.

11. The device of claim 10 where said disk motion is limited by damping means.

12. The device of claim 11 where said damping means is a spring in frictional contact with said disk.

13. The device of claim 11 where said damping means is a fluid in said cylindrical chamber.

14. The device of claim 13 where said cylindrical chamber side walls contain a semicircular groove and said disk contains a compatible tab of size and shape to move in said groove as said disk rotates in said cylindrical chamber.

15. The device of claim 10 with a clamping means to install said device on the handlebars of a bicycle or motorcycle.

16. The device of claim 10 with a leveling mounting means to install said device on a surface.

17. The device of claim 10 where the programming means is a process of operating a data processor of known type to enable said data processor to:
    a. receive a true position reading from said sensor engaged to said wheel;
    b. recall position values and associated slope values from said data processor's Read Only Memory, said position values straddling said true position value received from said sensor;
    c. either, after a number of iterations, with an equation of known type solve for true slope by interpolation between said slope values using said true position and a said position value;
    d. or sum associated slope value for said position value closest to said true position value to a running total and, after a number of iterations, send an average slope value to said display device.

* * * * *